United States Patent
Dou et al.

(10) Patent No.: US 9,299,195 B2
(45) Date of Patent: Mar. 29, 2016

(54) SCANNING AND TRACKING DYNAMIC OBJECTS WITH DEPTH CAMERAS

(71) Applicant: Cisco Technology, Inc., San Jose, CA (US)

(72) Inventors: Mingsong Dou, Chapel Hill, NC (US); Henry Fuchs, Chapel Hill, NC (US); Madhav Marathe, Cupertino, CA (US)

(73) Assignee: Cisco Technology, Inc., San Jose, CA (US)

(*) Notice: Subject to any disclaimer, the term of this patent is extended or adjusted under 35 U.S.C. 154(b) by 182 days.

(21) Appl. No.: 14/224,575

(22) Filed: Mar. 25, 2014

(65) Prior Publication Data

US 2015/0279118 A1 Oct. 1, 2015

(51) Int. Cl.
G06T 17/00 (2006.01)
G06T 19/20 (2011.01)
G06T 7/00 (2006.01)
H04N 7/15 (2006.01)

(52) U.S. Cl.
CPC ............... *G06T 19/20* (2013.01); *G06T 7/0065* (2013.01); *H04N 7/15* (2013.01); *G06T 17/00* (2013.01); *G06T 2207/10016* (2013.01); *G06T 2207/10028* (2013.01); *G06T 2207/20048* (2013.01); *G06T 2215/16* (2013.01); *G06T 2219/2004* (2013.01)

(58) Field of Classification Search
None
See application file for complete search history.

(56) References Cited

U.S. PATENT DOCUMENTS

2009/0284529 A1* 11/2009 De Aguiar ............ G06T 7/2046
345/420

FOREIGN PATENT DOCUMENTS

WO 2013074153 A1 5/2013
WO 2013162735 A1 10/2013

OTHER PUBLICATIONS

Cheng, Zhi-Quan, et al. "Non-rigid registration in 3d implicit vector space." Shape Modeling International Conference (SMI), 2010. IEEE, 2010.*
Izadi, Shahram, et al. "KinectFusion: real-time 3D reconstruction and interaction using a moving depth camera." Proceedings of the 24th annual ACM symposium on User interface software and technology. ACM, 2011.*

(Continued)

*Primary Examiner* — Sing-Wai Wu
*Assistant Examiner* — Ryan D McCulley
(74) *Attorney, Agent, or Firm* — Edell, Shapiro & Finnan, LLC

(57) ABSTRACT

A video conference server receives a plurality of video frames including a current frame and at least one previous frame. Each of the video frames includes a corresponding image and a corresponding depth map. The server produces a directional distance function (DDF) field that represents an area surrounding a target surface of the object captured in the current frame. A forward transformation is generated that modifies the reference surface to align with the target surface. Using at least a portion of the forward transformation, a backward transformation is calculated that modifies the target surface of the current frame to align with the reference surface. The backward transformation is then applied to the DDF to generate a transformed DDF. The server updates the reference model with the transformed DDF and transmits data for the updated reference model to enable a representation of the object to be produced at a remote location.

21 Claims, 10 Drawing Sheets

(56) References Cited

OTHER PUBLICATIONS

Li, Hao, et al. "Robust single-view geometry and motion reconstruction." ACM Transactions on Graphics (TOG). vol. 28. No. 5. ACM, 2009.*

Li, Hao, et al. "Temporally coherent completion of dynamic shapes." ACM Transactions on Graphics (TOG) 31.1 (2012): 2.*

Newcombe, Richard A., et al. "KinectFusion: Real-time dense surface mapping and tracking." Mixed and augmented reality (ISMAR), 2011 10th IEEE international symposium on. IEEE, 2011.*

Wand, Michael, et al. "Efficient reconstruction of nonrigid shape and motion from real-time 3D scanner data." ACM Transactions on Graphics (TOG) 28.2 (2009): 15.*

Dou, et al., "Scanning and Tracking Dynamic Objects with Commodity Depth Cameras," 2013 IEEE International Symposium on Mixed and Augmented Reality (ISMAR), Oct. 2013, 8 pages.

Dou, et al., "Temporally Enhanced 3D Capture of Room-sized Dynamic Scenes with Commodity Depth Cameras," retrieved from www.cs.unc.edu/~doums/pdfs/RoomsizedCapture-VR14.pdf, on Mar. 25, 2014, 6 pages.

* cited by examiner

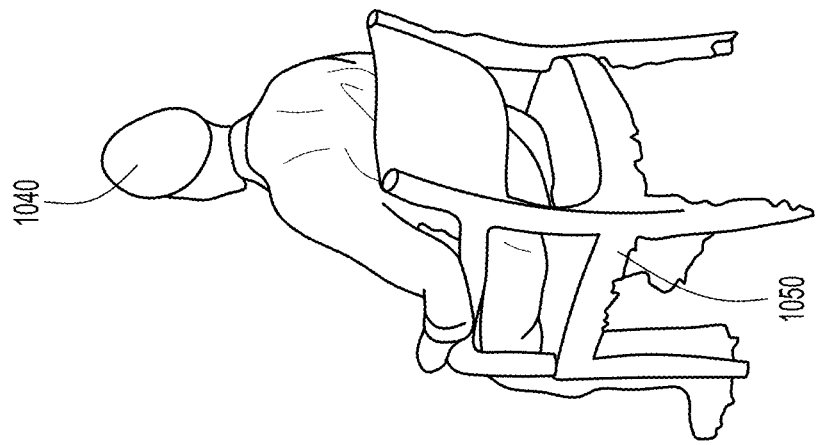
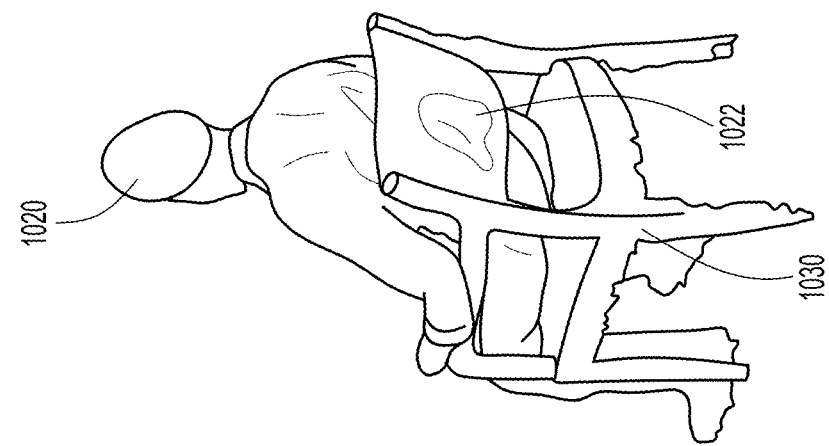
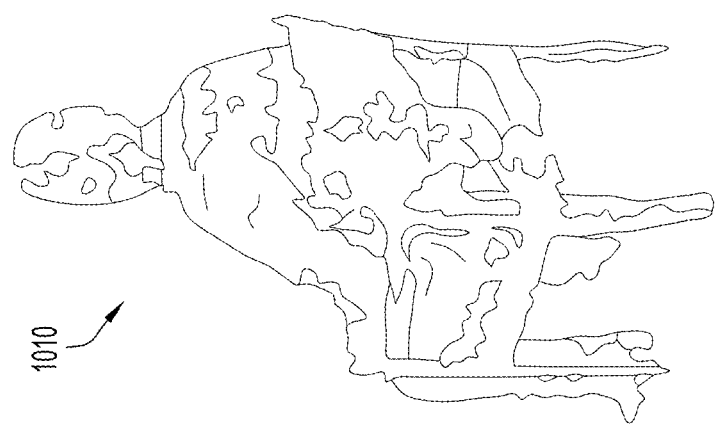

SCANNING AND TRACKING DYNAMIC OBJECTS WITH DEPTH CAMERAS

TECHNICAL FIELD

The present disclosure relates to three dimensional models of real world environments.

BACKGROUND

Three dimensional (3D) models have many uses in modern communication, such as novel view generation. "Novel view generation" is using the video from several cameras to construct a view from a point where there is no physical camera. This is valuable to provide a fly-through view of a factory or a sports game or a meeting, for example. Reconstruction algorithms for 3D models suffer from problems, such as incompletion due to occlusions and inaccuracy. Using temporal information has proven useful for improving reconstruction quality in some cases with rigid structures or restricted motion.

BRIEF DESCRIPTION OF THE DRAWINGS

FIGS. 10A, 10B, and 10C illustrate an example of preventing the models of two close objects from intersecting according to the techniques presented herein.

DESCRIPTION OF EXAMPLE EMBODIMENTS

Overview

In accordance with an embodiment, a video conference server receives a plurality of video frames including a current frame and at least one previous frame. Each of the video frames includes a corresponding image and a corresponding depth map. The calibration parameters (camera intrinsic matrix, lens distortion, and camera pose) of the camera for each video streams may be pre-computed. The server also stores a reference model including data representing a reference surface corresponding to typically one object captured in the video frames. This reference model may be initialized as data observed in the first frame and updated for the whole system operation. The server produces a directional distance function (DDF) field that represents an area surrounding a target surface of the object captured in the current frame. A forward transformation is generated that modifies the reference surface to align with the target surface. Using at least a portion of the forward transformation, a backward transformation is calculated that modifies the target surface of the current frame to align with the reference surface. The backward transformation is then applied to the DDF to generate a transformed DDF. The server updates the reference model with the transformed DDF and transmits data for the updated reference model and the forward transformation parameters to enable a representation of the object to be produced at a remote location.

EXAMPLE EMBODIMENTS

The following description is directed to techniques for extending the use of temporal information in 3D reconstruction of dynamic objects. The 3D capture system first builds a complete and accurate 3D model for dynamic objects (e.g., human bodies) by fusing a data sequence captured by commodity depth and color cameras, and then tracks the fused model to align it with following captures. One component of the system is the non-rigid alignment of the depth data at different instants during both scanning and tracking stages. The system integrates the measurement of both dense point cloud alignment and color consistency into an energy minimization problem, which is then solved efficiently by a gradient descent method. The system also extends the volumetric fusing algorithm to accommodate noisy 3D data during the scanning stage. Specifically, a new representation of 3D data is introduced, referred to herein as the Directional Distance Function (DDF), which incorporates a direction field pointing to the nearest points on the surface along with a signed distance field. The new data representation helps to solve the non-rigid matching algorithm more efficiently.

Figure 1:
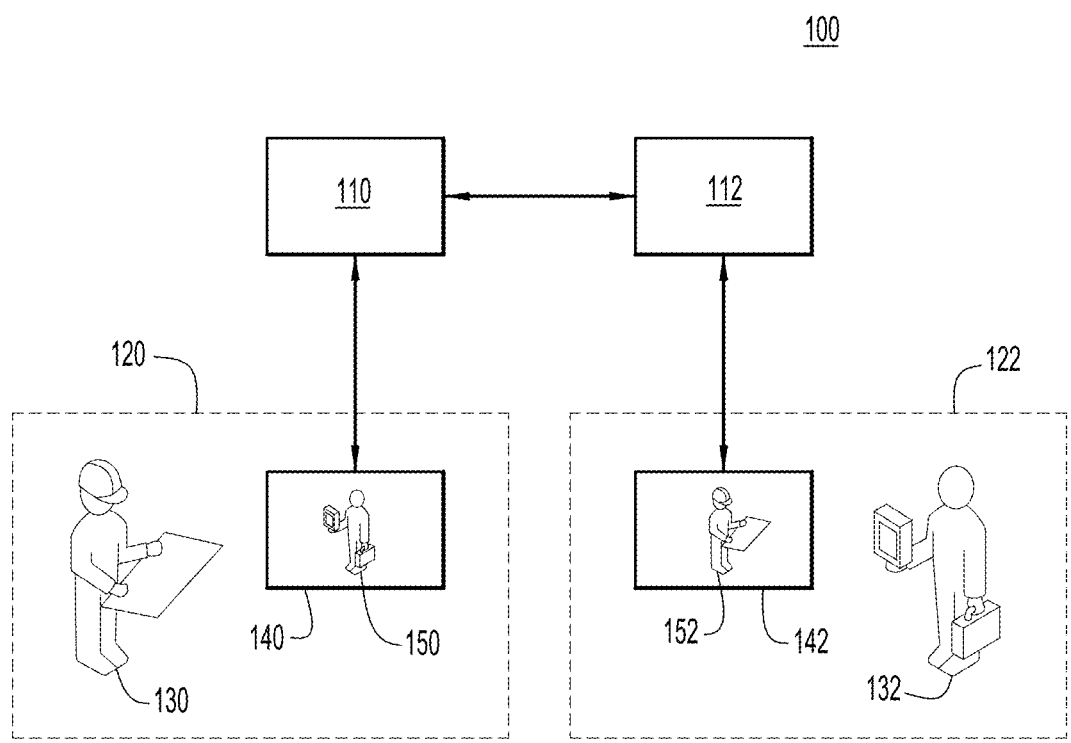
FIG. 1 is a block diagram of a video conference system capable of supporting an online conference session during which content may be shared according to the techniques presented herein.

Referring to FIG. 1, a video conference (e.g., telepresence) system 100 is shown with two computing devices (endpoints) 110 and 112 communicating data representing rooms 120 and 122. Rooms 120 and 122 include users 130 and 132, respectively, as well as display devices 140 and 142. Display 140 shows a representation 150 of user 132 to user 130. Similarly, display 142 shows a representation 152 of user 130 to user 132. Only two rooms are shown in FIG. 1, but any number of conference rooms and users may be included in system 100. Computing devices 110 and 112 may be co-located with rooms 120 and 122, and may take a variety of forms, including a server, desktop computer, laptop computer, mobile/cellular phone, tablet computer, etc. In another example, devices 110 and 112 may be implemented in one or more remote servers that are connected to rooms 120 and 122. The network that connects devices 110 and 112 to each other and to rooms 120 and 122 may be any type of network (e.g., any combination of Internet, intranet, local area network (LAN), wide area network (WAN), wired network, wireless network, etc.) that connects computing devices.

Figure 2:
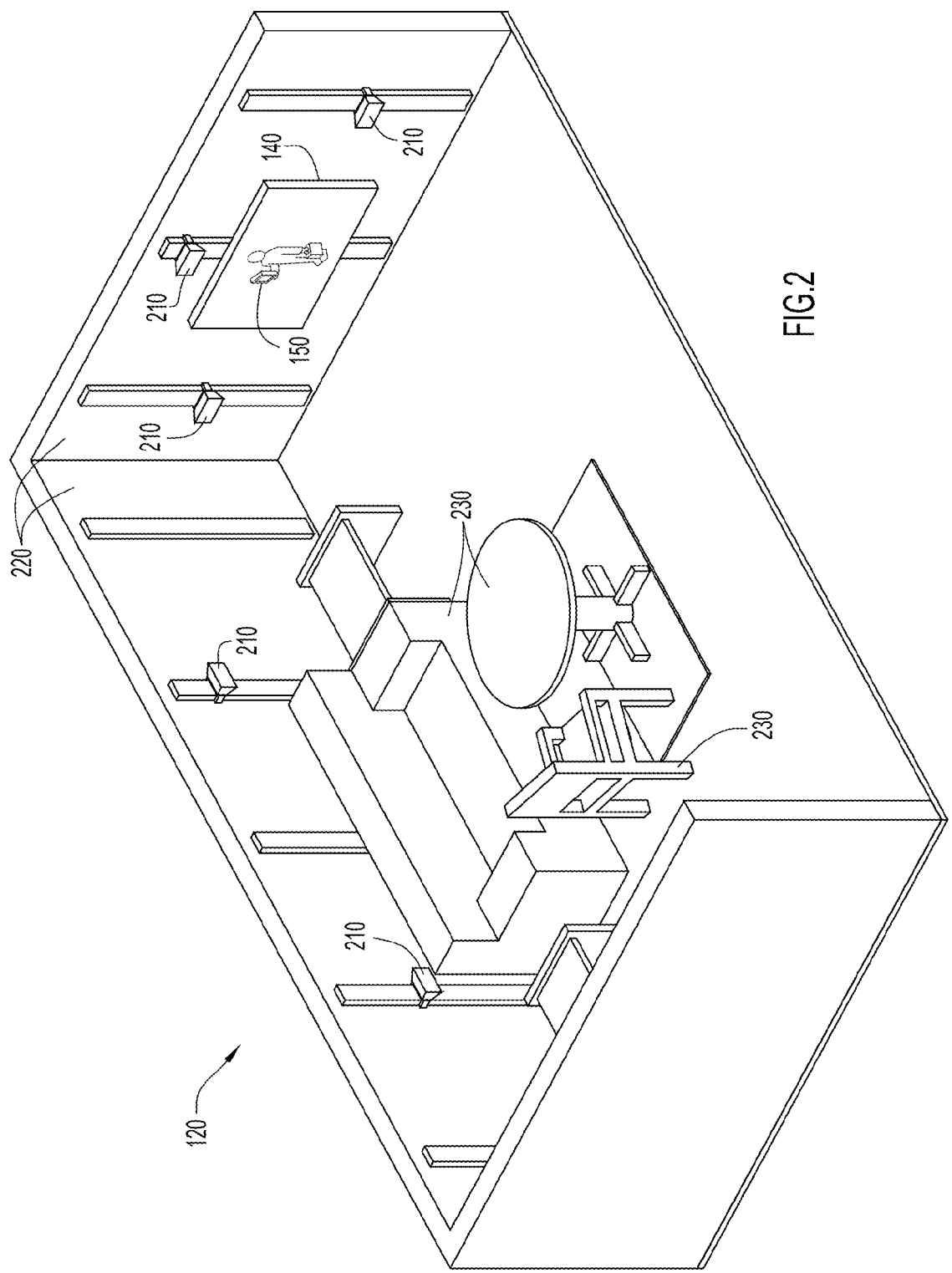
FIG. 2 is a diagram of a room with an array of cameras for supporting an online conference session according to the techniques presented herein.

Referring now to FIG. 2, an example of video conference room 120 is shown. Video conference room 120 may include one or more cameras 210 throughout the room to capture the objects in the room for display in a remote location. The objects in the room may include static objects that do not change, such as walls 220. The other objects 230 in the room 120 may be semi-static, i.e., they may change slightly. Some objects 230 may be dynamic objects that can change in position and/or configuration, such as chairs and people. In the example shown in FIG. 2, display 140 shows a representation 150 of a user at a remote location, allowing a user in room 120 to interact with the remote user.

Figure 3:
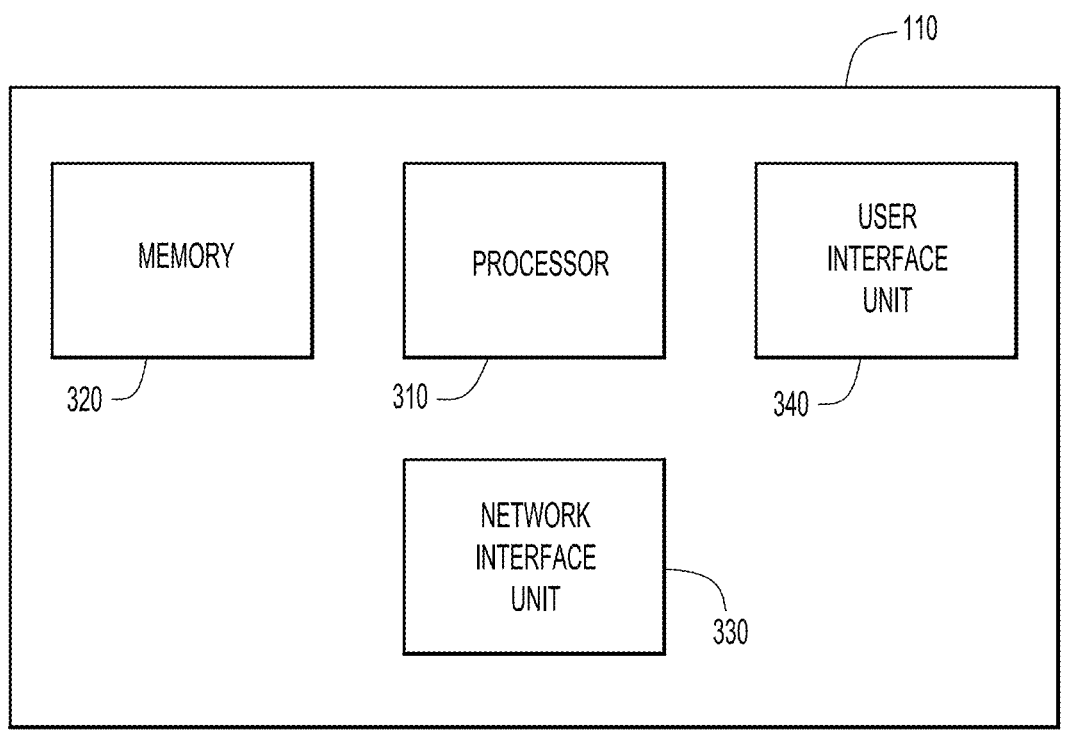
FIG. 3 is a block diagram of a server configured to support the online conference session according to the techniques presented herein.

Referring now to FIG. 3, a simplified block diagram of computing device 110 is shown. Device 110 includes a processor 310 to process instructions relevant to a telepresence session supported by the system 100, memory 320 to store a variety of data and software instructions (e.g., captured data frames, stored object models, instructions for creating and tracking object models, etc.). The device also includes a network interface unit (e.g., card) 330 to communicate with other devices. The device may also include a user interface unit(s) 340 in the form of a keyboard, mouse and/or a touch-screen user interface to allow for a user to interface with the device. Memory 320 may comprise read only memory (ROM), random access memory (RAM), magnetic disk storage media devices, optical storage media devices, flash memory devices, electrical, optical, or other physical/tangible (e.g., non-transitory) memory storage devices. The processor 310 is, for example, a microprocessor or microcontroller that executes instructions for implementing the processes described herein. Thus, in general, the memory 320 may comprise one or more tangible (non-transitory) computer readable storage media (e.g., a memory device) encoded with software comprising computer executable instructions and when the software is executed (by the processor 310) it is operable to perform the operations described herein. While computing devices 110 and 112 will be described as different devices, they may include similar elements and may each perform similar operations as described herein.

Non-Rigid Alignment for One Dynamic Object

When deforming a template surface to match with a target surface, the corresponding points should be as close as possible. However, the point correspondence is unknown before the alignment. In this example, the template surface is represented as a Directional Distance Function by adding a direction field pointing to the nearest points on the surface along with the signed distance field. In this way, an analytic solution for the derivatives of the measurement function can be deduced and the gradient descent vector may be computed. Additionally, a color consistency constraint may be integrated into the framework such that its derivative also has an analytical solution, which allows the problem to be solved efficiently and robustly.

Deformation Graph Model

In one example of a deformation graph model, a deformation is represented by a collection of affine transformations. A number of nodes (typically several hundred) are uniformly sampled from the template surface. In addition to its location $g_i$, each node $n_i$ has a 3×3 matrix $A_i$ and a translation 3D vector $t_i$ associated with it, representing the local affine transformation around the graph node. Neighboring nodes connect to each other and collectively form a Deformation Graph $G=\{\langle A_j, t_j, g_j \rangle\}_{j=1}^{J}$, an example of which will be discussed below referring to FIG. 4. Any given point v on the template surface could be deformed by applying a linearly blended affine transformation from its neighboring graph nodes N, $$\tilde{v} = \sum_{j \in N} w_j [A_j(v - g_j) + g_j + t_j], \quad (1)$$

where $w_j$ is the blending weight and depends on v's geodesic distance to graph node $n_j$. The surface normal is transformed according to, $$\tilde{n}_i = \sum_{j \in N} w_j A_j^{-1T} n_i. \quad (2)$$

During non-rigid alignment, $\{\langle A_j, t_j \rangle\}$ is estimated for the deformation graph by solving, $$\min_{\{\langle A_j, t_j\rangle\}} w_{rot} E_{rot} + w_{reg} E_{reg} + w_{com} E_{con} \quad (3)$$

where, $$E_{rot} = \sum_j \left((a_1^T a_2)^2 + (a_1^T a_3)^2 + (a_2^T a_3)^2 + (1 - a_1^T a_1)^2 + \right. \quad (4)$$
$$\left. (1 - a_2^T a_2)^2 + (1 - a_3^T a_3)^2\right) + c(\det(A_j) - 1)^2,$$

which constrains the column vectors $a_1$, $a_2$, $a_3$ of to being orthogonal and unitary. The determinant of $A_j$ is also constrained to being 1, which prevents flipping the surface normal. The constant c may be, for example, 100.

An additional regularization term $E_{reg}$ ensures the smoothness of the deformation:

$$E_{reg} = \sum_{j=1}^{J} \sum_{k \in N(j)} \|A_j(g_k - g_j) + g_j + t_j - (g_k + t_k)\|_2^2. \quad (5)$$

$E_{reg}$ constrains that when deforming $n_k$ with its neighbor $n_j$'s affine transformation, it does not deviate dramatically from the deformation with its own affine transformation. The third term $E_{con}$ comes from matched key points $\{\langle v_i, q_i \rangle\}$ of two surfaces, $$E_{con} = \sum_i \|\tilde{v}_i - q_i\|_2^2, \quad (6)$$

where $\tilde{v}$ is the deformed $v_i$ from Equation (1). In one example, the key points are Lucas-Kanade corner points that are converted to 3D points from 2D image locations using their observed depth.

To better align noisy 3D data from commodity depth cameras, additional terms $E_{dns\_pts}$ and $E_{clr}$ and respective blending weights $w_{dns\_pts}$ and $w_{clr}$ may be added for dense point cloud alignment and color consistency, respectively, transforming equation (3) to $$\min_{\{\langle A_j, t_j\rangle\}} w_{rot} E_{rot} + w_{reg} E_{reg} + w_{con} E_{con} + w_{dns\_pts} E_{dns\_pts} + w_{clr} E_{clr}. \quad (7)$$

Directional Distance Function and Measurement of Surface Alignment

The matched key points from $E_{con}$ are sparse features on the surface; their alignment does not represent the global surface alignment. A dense point alignment across the entire surface may represent the global surface alignment better than the alignment of key features at sparse locations. In one example, the target surface is represented as a distance field so that the surface alignment can be efficiently measured. At each voxel of the volume data, the distance D and direction P to its closest point on the surface are measured. This representation is an extension of a Signed Distance Function (SDF) and is called the Directional Distance Function (DDF). In this example, the energy function $E_{dns\_pts}$ for dense point cloud alignment is defined by, $$E_{dns\_pts} = \sum_i (D(\tilde{v}_i))^2 \qquad (8)$$

where $\tilde{v}_i$ is the deformed template surface point as defined in Equation (1).

In one example, the DDF may be calculated by recording the position of the nearest point on the surface, and subtracting its position to get P. In this example, the voxel whose closest surface point lies at the boundary of an open surface is set to null, which prevents surface extension when recovering a triangle mesh from a DDF. The surface boundary may be identified either as pixels on a depth map that have depth discontinuity with their neighbors or the vertices on a triangular mesh that do not share an edge with other triangles.

P in the Directional Distance Function may be helpful when minimizing Equation (7). Since the energy function is in least squares form, it may be efficiently solved via a gradient descent-like method (e.g., a Gauss-Newton algorithm) as long as the Jacobian matrix J is provided. One method of solving this nonlinear least squares problem is to use the Levenburg-Marquardt algorithm. The Jacobians for $E_{rot}$, $E_{reg}$, and $E_{con}$ are straightforward and will not be explicitly described herein. The Jacobian for $E_{dns\_pts}$ may be calculated from, $$\frac{\partial}{\partial p_k}(D(\tilde{v}_i)) = \nabla D\Big|_{\tilde{v}_i} \frac{\partial}{\partial p_k}\tilde{v}_i, \qquad (9)$$

where $p_k$ is the k-th deformation parameter. In one example of computing the DDF, P is aligned to the surface normal when $|D|<\epsilon$, for $\epsilon$ equal to, e.g., 1.5 cm.

In some examples, parts of the target surface where front and back surfaces are close enough that the deformed surface point $\tilde{v}_i$ are attracted to the wrong surface during iterations. Fortunately, $\nabla D|_{\tilde{v}_i}$ is the approximation of the normal of $\tilde{v}_i$'s closest point on the target surface. When the normal $\tilde{n}_i$ on the deformed reference surface does not agree with $\nabla D|_{\tilde{v}_i}$, this means is heading to the wrong side of the target surface. One way to nullify this attraction to the wrong part of the target surface is to let $$\frac{\partial}{\partial p_k}(D(\tilde{v}_i)) \leftarrow 0, \text{ if } \nabla D|_{\tilde{v}_i} \cdot \tilde{n}_i < 0.$$

Color Consistency

To maintain color consistency, when deforming the template surface to the target, the matched points may have similar color and/or texture. The $E_{clr}$ term helps resolve alignment ambiguities when a near-symmetric part on the surface rotates or moves, such as head turns and arm rotations. In one example, the template surface is the currently accumulated 3D model from the depth and color of previous frames, and it is represented by a triangle mesh with a 3D color vector c, attached at each vertex. The target surface is the current observation of the dynamic object, and its raw representation is a set of depth maps $\{Z_k\}$ and color images $\{I_k\}$.

With the depth and color cameras calibrated under the same world coordinate system, $P_k$ projects a 3D point to the k-th image coordinate. Thus, the color consistency term in Equation (7) is $$E_{clr} = \sum_k \sum_i \|\delta_k(\tilde{v}_i) \cdot [I_k(P(\tilde{v}_i)) - c_i]\|_2^2, \qquad (10)$$

where $\delta_k(\tilde{v}_i)$ is the visibility term. In other words, $\delta_k(\tilde{v}_i)=1$ when is visible to the k-th color camera, and 0 when not visible. Visibility checking may be performed with a z-buffer algorithm. Additionally, $\delta_k$ may be set to zero for vertices whose outward normal point away from the camera, to prevent holes in the incomplete front surface from erroneously letting parts of back-facing surfaces pass the z-buffer test.

The Jacobians for $E_{clr}$ have an analytic solution:

$$\frac{\partial}{\partial p_k} I_k^c(P(\tilde{v}_i)) = \nabla I_k^c \cdot \frac{\partial}{\partial \tilde{v}_i} P \cdot \frac{\partial}{\partial p_i} \tilde{v}_i,$$

where $\nabla I_k^c$ is the image gradient for the c-th channel of the k-th color image. The visibility check may be performed at each iteration of the gradient descent method, since each iteration produces a differently deformed template surface.

Figure 4:
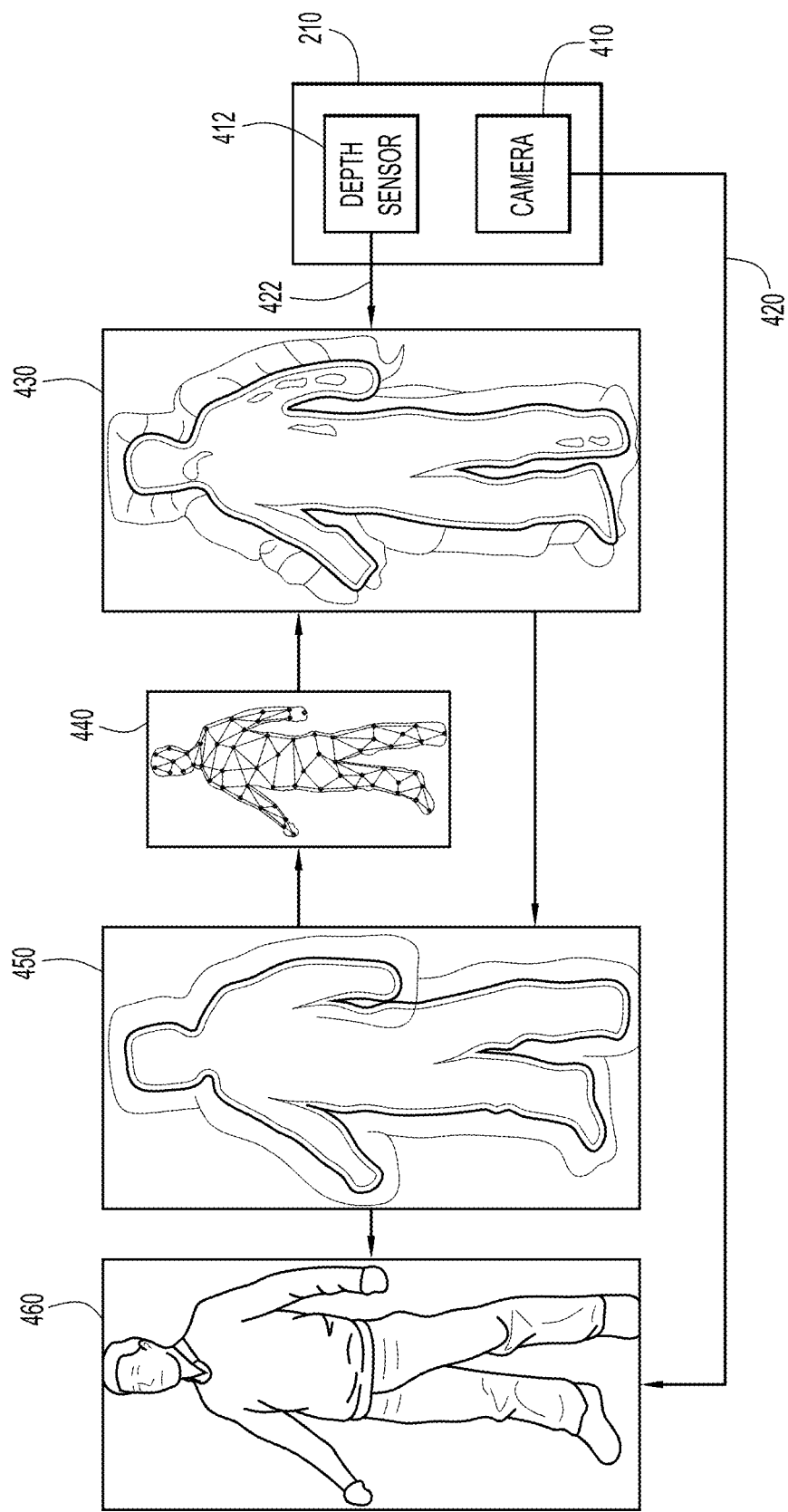
FIG. 4 is a diagram that illustrates the flow of data in creating, updating, and tracking a model of a person according to the techniques presented herein.

Referring now to FIG. 4, an example of deforming a reference model to track the latest observed frame will be described. Camera 210, comprising color camera 410 and depth sensor 412, provides a frame with image 420 and a depth map 422. In this description, only a single camera 210 will be described, but typically multiple cameras will provide image and depth data that is combined into a single frame. The depth map 422 is converted into a Directional Distance Function 430 for the object (e.g., a person) detected in the frame. A deformation graph triangle mesh 440 is sampled from the reference surface of reference model 450 and parameters are calculated for a forward deformation to align the reference model 450 with the DDF 430 of the current frame. The reference model 450 is further aligned with the color and/or texture from the image 420 as well as from previous color images that have been accumulated in the reference model.

Still referring to FIG. 4, an example of building the reference model by accumulating frames will be described. A backward deformation from the DDF 430 to the reference model 450 is computed according to the forward deformation. Details of the backward deformation are described later. Once the DDF 430 of the current frame is deformed back to the reference state, it is fused into a Multi-Mode Distance Function (MDDF) at the reference. The MDDF is similar to a DDF, except that is comprises multiple distance values and direction vectors at each voxel. A more detailed description of the MDDF will be presented below. To update the reference model with data from the latest captured frame, a new reference surface is generated from the MDDF and the new reference surface is textured with color data from all of the captured frames to form the updated, colored reference model 460.

Backward Deformation from Target to Reference

Given the forward deformation parameters $\{<A_j, t_j>\}$, one example may be to set the backward deformation parameters as $\{<A_j^{-1}, -t_j>\}$, and the graph node position as $g_j+t_j$. However, this simple inversion of the forward deformation does not guarantee a close backward alignment, since the inverse of the linear interpolation of affine matrices does not equal the linear interpolation of the inverse of affine matrices. In another example, the point correspondence of the references and target are found according to the forward deformation, and the backward deformation parameters are estimated by formulating the point correspondence into $E_{con}$.

In this example, a backward transformation that is estimated for transforming the target surface to the reference surface is applied directly on the DDF of the current frame. Although the non-rigid transformation is only defined on the surface, each voxel of the DDF may be transformed according to the deformation parameters of its closest point on the surface. The following algorithm shows one example of a solution to deforming the target DDF 430 to a reference model 450:

for each i-th voxel of $F_{trg}$ at location $p_i$ with direction to the nearest surface point denoted as $P_i$ and distance value denoted as $D_i$, do
1. deform its location according to Equation (1): $p_i \rightarrow \tilde{p}_i$;
2. deform its direction $P_i$ according to Equation (2): $P_i \rightarrow \tilde{P}_i$;
3. record the deformed voxel as a 4-tuple: $\langle p_i, \tilde{p}_i, \tilde{P}_i, D_i \rangle$;

for each voxel of $F_{ref}$ at location q, do
1. find the set of its neighboring deformed $F_{trg}$ voxel:

$$S = \{\langle p_k, \tilde{p}_k, \tilde{P}_k, D_k\rangle | \|\tilde{p}_k - q\| < \varepsilon\};$$

2. Divide S into subgroup $\{G_i\}$ by clustering on p;
3. Find the subgroup $G_s$ with the smallest averaged D;
4. set the direction and distance value of $F_{ref}$ at q:

$$P_{ref} = \sum_{k \in G_s} w_k \tilde{P}_k$$

$$D_{ref} = \sum_{k \in G_s} w_k D_k$$

where $w_k = \exp(-(q - \tilde{p}_k)^2)$

One situation that may be handled separately is when the transformed voxels collide with each other. At each voxel position on $F_{ref}$, the nearby transformed $F_{trg}$ voxels are found and grouped according to their original grid positions. The group with the smaller absolute value distance is found, and the direction vector and signed distance value for the $F_{ref}$ are interpolated from this group.

Fusion of Multiple DDFs for One Dynamic Object

In an example when the noise level of the DDF is low, summing over multiple aligned DDFs cancels out the noise, and the surface can be recovered by finding the zero-crossing of the fused distance field, e.g., with a Marching Cubes algorithm. However, in an example with the noise level comparable to the object dimension, summing over the distance field would expand the surface artificially and provide zero-crossing that do not accurately find the reference surface. This is because the distance field needs to be truncated so that the distance field of a front surface does not interfere with the surface behind. The distance $\mu$ behind the surface where truncation begins in this example should be positive relevant to the noise level. In an example where a large $\mu$ is chosen to suppress the noise, the zero-crossing of the fused distance field may not align with the surface due to the interference between the distance functions of the front and back surface.

In another example, $\nabla D$ may be used to differentiate which surface a distance value corresponds to, and $\nabla D$ may be obtained using Equation (9) above. In this example, multiple DDFs are fused by, at each voxel, summing only over the distance value D with similar $\nabla D$, preventing the interference between the distance fields corresponding to different surface parts. This results in a new data structure: the Multi-Mode Directional Distance Function (MDDF). Each voxel of a MDDF records a set of averaged D's, $\nabla D$'s, and the weights on all modes. In this way, a new DDF can be fused to the reference MDDF by finding the mode with the most similar $\nabla D$ at each voxel, then the distance value and $\nabla D$ of the new DDF is incorporated into that mode and the weights are updated. To recover the reference surface from a MDDF, a single mode may be selected to downgrade it to a DDF. In one example, the mode selected is the one with the smallest absolute distance value.

After fusing a number of DDFs (e.g., a few hundred) of the same object, the improvement on a scanned model tends to converge. Thus, in one example, a complete model is considered to be achieved, and the backward deformation steps may be omitted. In this example, only the forward deformation steps of tracking a scanned object to a reference model is used, and the reference model is not updated with further scanned frames of the object.

To track a fast moving surface, a Kalman filter may be used to predict the translation vector $t_j$ for each deformation node of the next frame. This prediction may be used as the initial parameter of the non-rigid alignment problem. In this example, the matrices $\{A_j\}$ are initialized using the values of the last frame.

In another example, the surface being tracked may be constrained to roughly isometric deformation, i.e., the geodesic distance of any pair of surface points is preserved during deformation. For example, the deformation of a 3D human body model may be nearly isometric. In this example, a new term $E_{len}$ is added to the energy minimization problem of Equation (7), as follows, $$E_{len} = \sum_{j=1}^{J} \sum_{k \in N(j)} \|\|g_j + t_j - g_k - t_k\| - \|g_j - g_k\|\|_2^2. \quad (11)$$

where $g_j$ and $t_j$ are the node location and translation vector of the deformation graph, respectively, and N(j) are neighbors of the j-th node. $E_{len}$ penalizes the changes of the length of the edge connecting the neighboring nodes during deformation. Although $E_{len}$ does not guarantee an exact isometric deformation, it may be effective to minimize stretching and shrinking of the surface. In one example, $E_{len}$ may allow for length changes for some parts, e.g., outliers.

Figure 5:
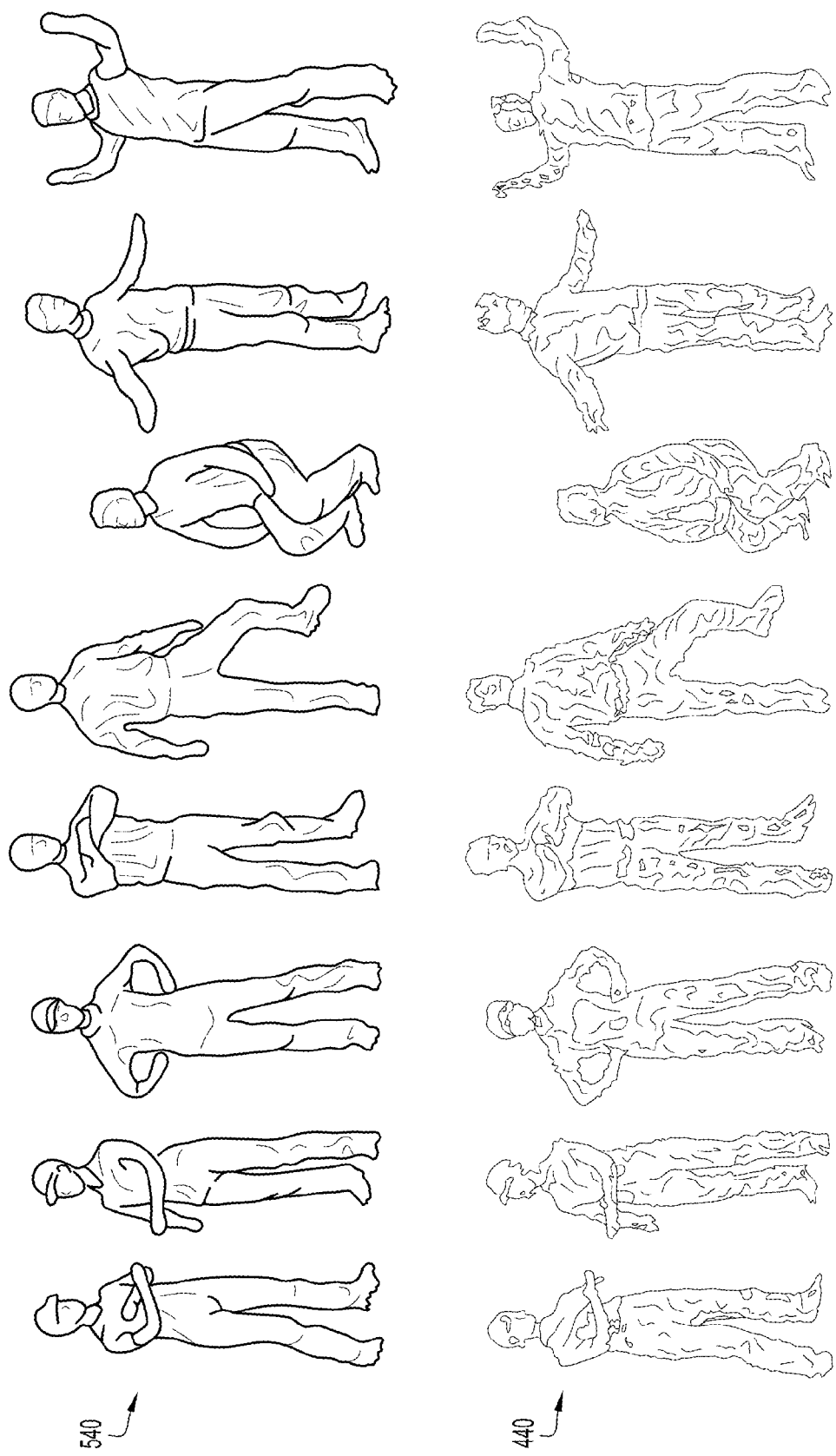
FIG. 5 is a diagram that illustrates depth data of a person captured at a single frame, and a model, deformed according to the techniques presented herein, that matches the captured frame.

Referring now to FIG. 5, several examples of reference models deformed to match captured frames are shown. Single captured frames are shown as triangle meshes 440 along the bottom row of FIG. 5. Deformed reference models 540 are shown along the top row with the respective reference models being deformed to match the corresponding single captured frame below it.

Figure 6:
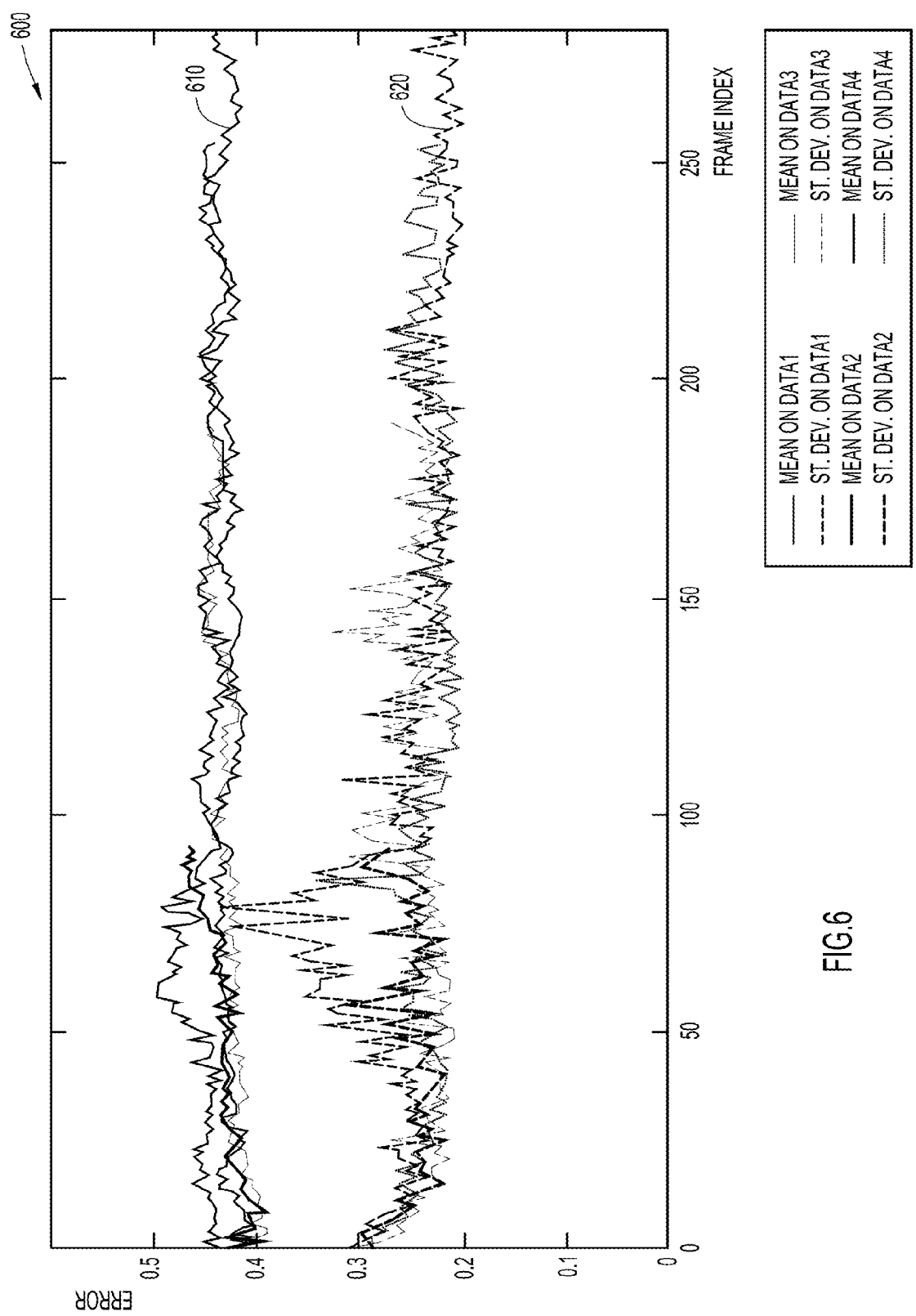
FIG. 6 is a graph showing the stability of the error between the model and captured frames of depth data accumulated over a plurality of frames according to the techniques presented herein.

Referring now to FIG. 6, a graph 600 is shown of a plurality of examples of the convergence in error as additional frames are fused to the reference model. In graph 600, the mean 610 and standard deviation 620 of the difference between the scanned model and the observed surfaces at each frame. To measure the difference, the observed surfaces are deformed to the reference surface as described above. The averaged distance between matched points is used as the measurement of the surface difference shown in lines 610. As shown by the mean difference 610 in graph 600, the difference between the model accumulated from multiple frames and each individual frame stays relatively constant as the number of frames included in the model increases. This indicates that the nonrigid alignment algorithm functions well, and the scanning system handles any issues in error accumulation of the model.

Figure 7:
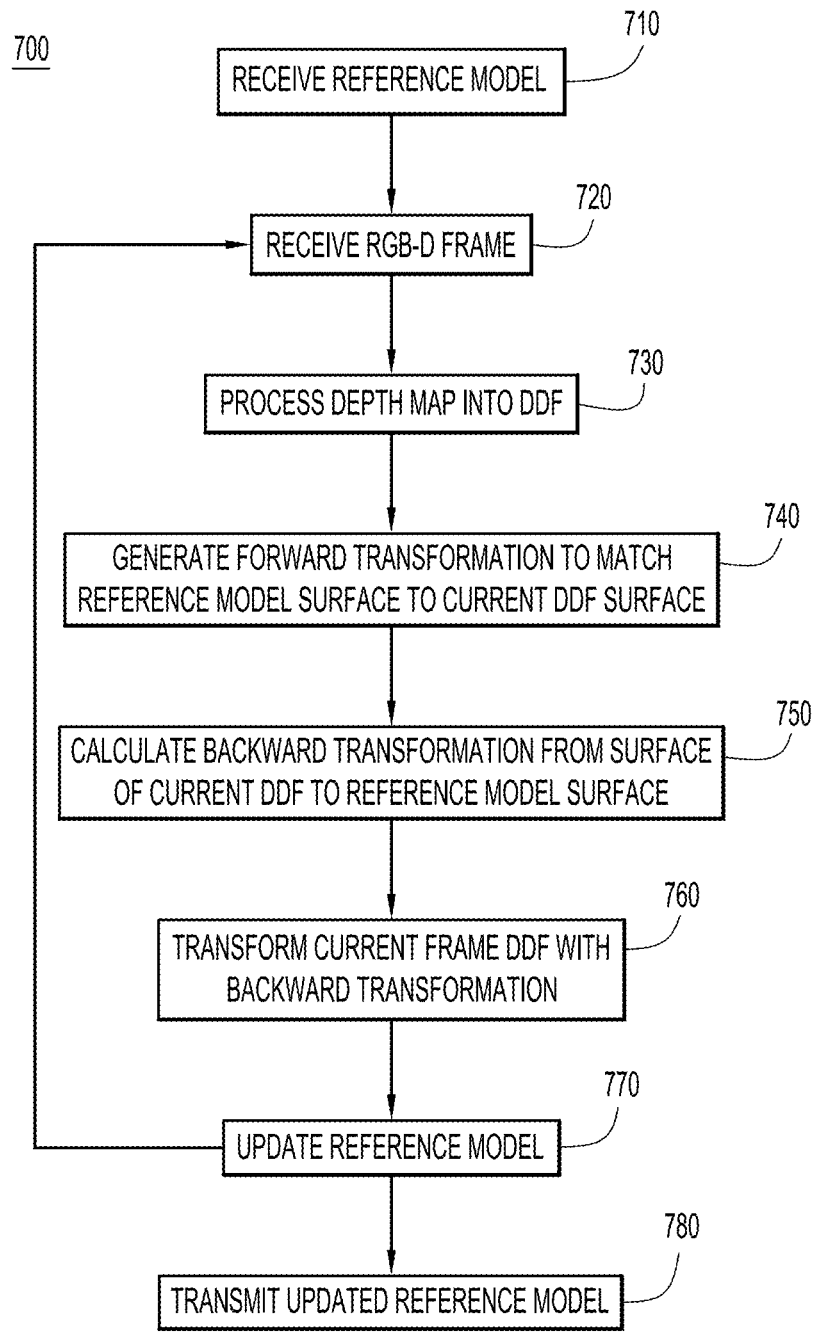
FIG. 7 is flowchart of an example process for building a model from observed frames according to the techniques presented herein.

Referring now to FIG. 7, an example process 700 for updating a reference model with captured frame is described. Initially, in step 710, a server or other computing device receives a reference model of at least one dynamic object in a room. In one example, the reference model is based on the initial frame that is captured at the beginning of a telepresence session. In another example, the reference model has been pre-scanned by either the same computing device or a separate computing device. The reference model may comprise a reference surface that represents the surface of the dynamic object.

In step 720, the server receives a frame that contains color and depth information. One example of color information comprises red, green, and blue (RGB) data for pixels, and depth information may comprise a distance from the camera to the object that is captured in a pixel of the image. While forms of color information other than RGB may be used, hereinafter the data in the frame will be called RGB-D data. The RGB-D frame may comprise information from multiple cameras that has been combined into a single frame. In one example, a plurality of cameras may have views of different portions of the dynamic object in the room, and each camera provides RGB-D data. Alternatively, some cameras may provide color data, while separate cameras provide depth information.

In step 730, the server processes the depth information (e.g., depth map) from the received RGB-D frame and creates a directional distance function (DDF) field. The DDF field is used to determine a target surface that represents the surface of the dynamic object captured in the frame. The target surface may be an incomplete representation of the dynamic object, e.g., due to occlusion of the camera's field of view.

In step 740, the server generates a forward transformation to align the reference surface from the reference model to the target surface of the current frame. One example of an algorithm described above accounts for various factors (e.g., matching key points on the depth map, matching color information, isometric deformation, etc.) in determining the forward transformation.

In step 750, the server calculates a backward transformation to align the target surface of the current frame to the reference surface of the reference model. Some of the factors determined from the forward transformation may be used to assist in calculating the backward transformation. In one example, the matched points found for the forward transformation may be used in calculating the backward transformation. Once a suitable backward transformation is calculated that aligns the target surface back to the reference surface, the transformation is applied to the voxels of the DDF field of the current frame, at step 760.

In step 770, the backward transformed DDF is used to update the reference model with information from the current frame. After the reference model is updated, it may be transmitted for use in another computing device. In one example, the reference model is transmitted to a remote server enabling the remote server to produce a representation of the dynamic object at the remote location.

Figure 8:
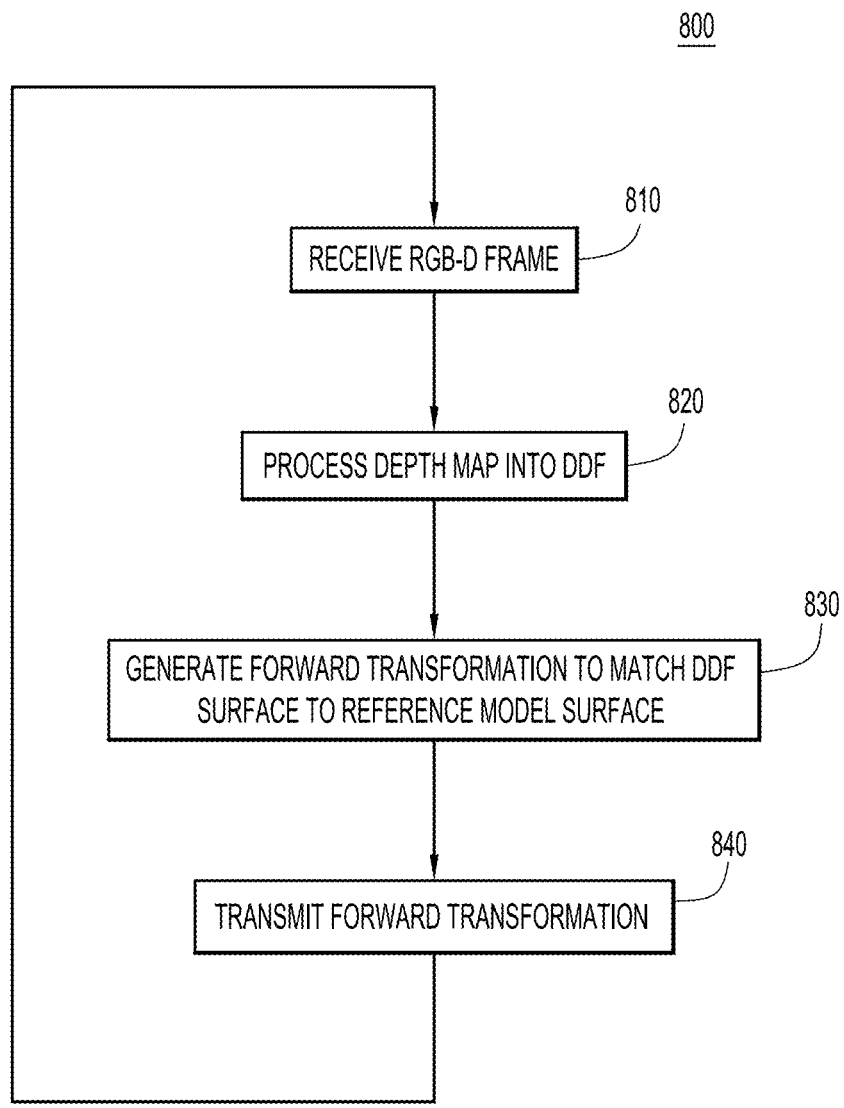
FIG. 8 is a flowchart of an example process for tracking the model to an observed frame according to the techniques presented herein.

Referring now to FIG. 8, an example process 800 for tracking a dynamic object to a reference model is described. In step 810, a server or other computing device receives an RGB-D video frame with color and depth information about the dynamic object captured in the frame. As described with respect to process 800, the video frame may comprise information from multiple cameras. For each RGB-D frame that is received, at step 820, the server processes the depth map from the current frame into a DDF field with a target surface. In step 830, the server generates a forward transformation to align a reference surface from a reference model to the target surface of the DDF of the current frame. The server may then transmit the forward transformation at step 840.

Tracking Both Dynamic Objects and Static Objects

In some examples, a room may include static objects, semi-static objects and dynamic objects. Static objects include objects and surfaces that will not move throughout the length of a conference session, e.g., walls, pictures hung on a wall, floor, etc. Static objects may be pre-scanned and reproduced in the reference model using only the pre-scan, i.e., static objects do not need to be tracked throughout the conference session. Semi-static objects include objects that may move, but will move rigidly, e.g., chairs, tables, etc. Semi-static objects may change by translation or rotation throughout the room, but will not change configuration. Once a model of a semi-static object is generated (e.g., in a pre-scan), then tracking the object in a conference session only requires detecting rigid changes in translation and rotation. Dynamic object include objects, e.g., human bodies, which may move nonrigidly. Dynamic objects will be tracked both for location and surface deformation. Additionally, an object may break and segment into multiple objects, e.g., when a box is picked up from a table. An object may also change from one type to another, e.g., when a static object is moved or a semi-static object changes shape. While only three examples of types of objects have been described herein, more or fewer types of objects may be used to characterize a scene. The dynamic objects may be pre-scanned using the accumulation system introduced earlier.

In one example, a unified tracking algorithm deforms or transforms pre-scanned semi-static object models along with dynamics models accumulated throughout the conference session. Semi-static objects move rigidly, and their movements may be represented by rotation matrices and translation vectors. A vertex v on a semi-static model may be transformed as $$\tilde{v} = R_i v + T_i, \quad (12)$$

where $\tilde{v}$ is the transformed vertex, $R_i$ is the rotation matrix, and $T_i$ is the translation vector. The nonrigid movements of dynamic objects are transformed as described above. Combining the rigid transformations of the semi-static objects and the nonrigid transformations of the dynamic objects allows for a unified tracking algorithm for some or all of the objects in a video conference session.

Figure 9A:
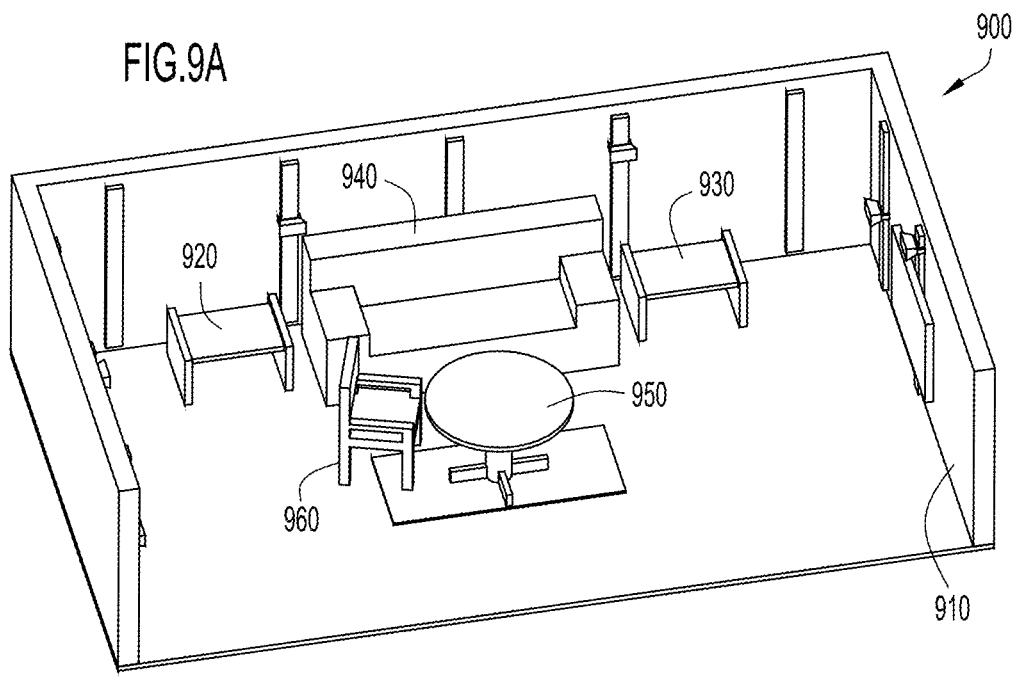
FIG. 9A is a diagram of a model of a room captured according to the techniques presented herein.
Figure 9B:
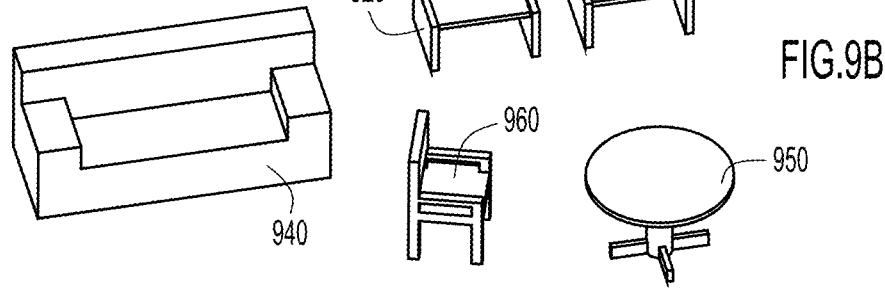
FIG. 9B is a diagram of the model segmented in static, semi-static, and dynamic objects according to the techniques presented herein.

Referring now to FIGS. 9A and 9B, a pre-scan of room 900 is shown with various object models of static and semi-static objects, before and after object segmentation. FIG. 9A shows the entire room with objects in place, and FIG. 9B shows each segmented object individually. The ceiling, floor, and walls 910 are detected and categorized as static objects that will not change in a video conference session. End tables 920 and 930, sofa 940, table 950, and chair 960 are also detected each as individual objects and categorized as semi-static objects. The rigid movements of semi-static objects may be tracked throughout a video conference session, and the position of the models is updated accordingly. In contrast, both the rigid and non-rigid movements of dynamic objects, such as people interacting in the session, may be tracked and updated throughout the video conference session. In one example, the static objects and semi-static objects may be pre-scanned separately from any video conference session. The pre-scan may be captured by a single, moving camera that captures color and depth data. Alternatively, multiple cameras may be used, and some or all of the cameras may be stationary or moving. In another example, object models may be improved by fit to apparent characteristics (e.g., symmetries of round table 950) and/or by fit to previously known models (e.g., provided by the manufacturer of the object or a third party).

In one example of a pre-scanned room, the dominant planes in the room are extracted to form the room frames. In other words, six planes that comprise a relatively large number of data points (corresponding to the floor, walls, and ceiling) are detected. Additionally, surface points within a certain distance from one of the planes may also be denoted as part of the room frame to accommodate noise in the camera(s) and/or minor irregularities in the wall surfaces (e.g., paintings hung on the wall, area rugs, etc.). The remaining surface mesh after eliminating the room frame represents everything inside the room. Connected component labeling is run on this remaining surface mesh to segment it into isolated triangle meshes. In one example, each isolated triangle mesh may be further identified as a semi-static object or a static object.

Introducing dynamic objects to a pre-scanned room of static and semi-static objects may lead to the dynamic objects closely interacting with other objects. In some examples, the models of the dynamic objects may appear to penetrate the other object, rendering an unphysical result in which solid objects appear to pass through each other. This may be caused by severe occlusions during the interaction and/or by the high degree of freedom on the non-rigid movements of the dynamic object. Additionally, self-intersection may occur when different parts of the same dynamic object are in close proximity, e.g., a person crossing their arms. In one example, an additional term $E_{insct}$ may be added to the energy minimization problem to force intersecting surfaces to move apart. One example of the additional term $E_{insct}$ is given by $$E_{insct} = \sum_{v \in \{S_i\}} \delta(\tilde{n}^T(\tilde{v} - \tilde{v}_{nr}) > 0 \ \& \tilde{n}_{nr}^T(\tilde{v} - \tilde{v}_{nr}) < 0)(\tilde{n}_{nr}^T(\tilde{v} - \tilde{v}_{nr}))^2, \quad (13)$$

where $\delta$ is a function that evaluates its Boolean argument and returns 1 if the argument is true and returns 0 otherwise.

To detect whether a vertex $\tilde{v}$ intersects others, the nearest neighbor point $\tilde{v}_{nr}$ on other surfaces or parts is determined. If the outward normal $\tilde{n}$ points in the direction of the nearest neighbor point $\tilde{v}_{nr}$, and the outward normal $\tilde{n}_{nr}$ points in the direction of the point $\tilde{v}$, then the surfaces do not intersect and $E_{insct}$ is zero. If the outward normals point away from the nearest neighbor point, then $E_{insct}$ pushes $\tilde{v}$ toward the position where $\tilde{v} - \tilde{v}_{nr}$ is perpendicular to $\tilde{n}_{nr}$, which is the direction departing the other surface. In other words, if the outward normal of the point on the dynamic object is pointing to the nearest point on the static object AND the outward normal of the point on the static object is pointing to the point on the dynamic object, then the two objects are not intersecting. The outward normals are pointing at each other.

After adding the new term $E_{insct}$, the final energy minimization problem for tracking both dynamic and rigid objects may be formulated as $$\min_{\{G_i\},\{R_j,T_j\}} w_{rot}E_{rot} + w_{reg}E_{reg} + w_{con}E_{con} + \\ w_{dns\_pts}E_{dns\_pts} + w_{clr} + E_{clr} + w_{insct}E_{insct}, \quad (14)$$

where $G_i$ represents the parameters $\{<A_k, t_k>\}$ of the deformation graph for a dynamic object, and $<R_j, T_j>$ are the transformation parameters for a rigid object. $E_{dns\_pts}$ and $E_{clr}$ have the same form as those in equation (8) and (10) except $v$ in the equations can be a vertex either from a dynamic object or a rigid object. $E_{rot}$ and $E_{reg}$ are constraints on the deformation graphs for dynamic objects and have the same definition as those in equation (7). $E_{con}$ contains the constraints from the matched sparse feature points between reference surfaces and target surfaces and has the same definition as the one in equation (7).

Referring now to FIGS. 10A, 10B, and 10C, an example of intersection conditions applied to dynamic objects is shown. Depth map 1010, shown in FIG. 10A, shows a captured frame of a person sitting in a chair. FIG. 10B shows the depth map segmented into a model 1020 of a person and model 1030 of the chair. The example shown in FIG. 10B does not have an intersection detection energy term, and portion 1022 of model 1020 passes through model 1030. This gives the appearance that the person's back has passed through the solid backrest on the chair. FIG. 10C shows the model 1040 of the person and model 1050 of the chair, including a energy term that detects and inhibits intersecting surfaces. In the example of FIG. 10C, the models 1040 and 1050 are prevented from intersecting, maintaining a consistent appearance.

In summary, the telepresence system described herein comprises a unified system that scans and tracks dynamic objects with dramatic movements using potentially noisy depth and color cameras. The system includes a non-rigid algorithm that integrates the measurement of both dense point cloud alignment and color consistency into an energy minimization problem. The energy minimization problem is then solved efficiently by the gradient descent method. The system also includes a 3D data fusion algorithm that handles noisy depth cameras and fuses depth information into a clean and accurate model.

The above system could be extended to track both dynamic and rigid objects by adding a new constraint to prevent the surface intersection. The extended system first pre-scans the static part of the room and segment the room into static background and semi-static objects. The dynamic objects (e.g., human beings) in the room may be pre-scanned with the earlier system by non-rigidly aligning data and accumulating data over time. The extended system then tracks both dynamic and semi-static objects together.

In one particular example, a method for updating a reference model includes receiving a plurality of video frames comprising a current frame and at least one previous frame. Each of the plurality of video frames includes data for a corresponding image and data for a corresponding depth map. The method further comprises receiving a reference model that includes data from the at least one previous frame. The reference model includes data representing a reference surface corresponding to at least one dynamic object captured in the plurality of video frames. The method processes the data representing the depth map of the current frame to produce data for a directional distance function (DDF) field that represents an area surrounding a target surface of the at least one dynamic object captured in the current frame. A forward transformation is generated that modifies the data representing the reference surface to align with data representing the target surface. Using at least a portion of the forward transformation, a backward transformation is calculated that modifies data representing the target surface of the current frame to align with the reference surface. The backward transformation is then applied to the DDF to generate a transformed DDF. The method updates the reference model with the transformed DDF to produce data for an updated reference model. Data for the updated reference model may then be transmitted to one or more remote locations to enable a representation of the dynamic object to be produced at a remote location.

In another example, an apparatus comprises a network interface configured to communicate data across a computer network, a user interface unit configured to communicate with at least one video camera, and a processor configured to process the video data. The processor receives, from the user interface unit, a plurality of video frames comprising a current frame and at least one previous frame. Each of the plurality of video frames includes data for a corresponding image and data for a corresponding depth map. The processor receives a reference model that includes data from the at least one previous frame. The reference model includes data representing a reference surface corresponding to at least one dynamic object captured in the plurality of video frames. The processor processes the data representing the depth map of the current frame to produce data for a directional distance function (DDF) field that represents an area surrounding a target surface of the at least one dynamic object captured in the current frame. A forward transformation is generated that modifies the data representing the reference surface to align with data representing the target surface. Using at least a portion of the forward transformation, a backward transformation is calculated that modifies data representing the target surface of the current frame to align with the reference surface. The backward transformation is then applied to the DDF to generate a transformed DDF. The processor updates the reference model with the transformed DDF to produce data for an updated reference model.

In yet another example, a system comprises a plurality of video cameras and a computing device. The plurality of video cameras are configured to capture a plurality of video frames. The plurality of video frames comprises a current frame and at least one previous frame, and each of the plurality of video frames includes data for a corresponding image and data for a corresponding depth map. The computer receives the plurality of video frames and a reference model that includes data from the at least one previous frame. The reference model includes data representing a reference surface corresponding to at least one dynamic object captured in the plurality of video frames. The computing device processes the data representing the depth map of the current frame to produce data for a directional distance function (DDF) field that represents an area surrounding a target surface of the at least one dynamic object captured in the current frame. A forward transformation is generated that modifies the data representing the reference surface to align with data representing the target surface. Using at least a portion of the forward transformation, a backward transformation is calculated that modifies data representing the target surface of the current frame to align with the reference surface. The backward transformation is then applied to the DDF to generate a transformed DDF. The computing device updates the reference model with the transformed DDF to produce data for an updated reference model.

In yet another example, a system comprises a plurality of video cameras mounted on the walls of a room and a computing device. The plurality of video cameras are configured to capture a plurality of video frames. Each of the plurality of video frames includes data for a corresponding image and data for a corresponding depth map. In addition, the system has offline procedures. During these offline procedures, the system pre-scans the static part of the room. The pre-scanned room is segmented into a static background and semi-static objects. The static background comprises the part that does not move significantly, such as the walls and floors, while the semi-static objects moves only rigidly, such as chairs and tables. The dynamic objects in the room are also required to be scanned, which may be done by the system introduced in the above first example. As described herein, scanning comprises acquiring the 3D representation of an object, which may be represented by triangle meshes (or surfaces). After the offline processing described above, the system may track both the dynamic objects and semi-static objects and may deform or transform the scanned dynamic and semi-static surface to the target surface captured by the plurality of video cameras. The deformed surfaces have the same quality as the pre-scanned surface.

The above description is intended by way of example only. Various modifications and structural changes may be made therein without departing from the scope of the concepts described herein and within the scope and range of equivalents of the claims.

What is claimed is:

1. A method comprising:
   receiving a plurality of video frames comprising a current frame and at least one previous frame, wherein each of the plurality of video frames includes data for a corresponding image and data for a corresponding depth map;
   receiving a reference model comprising data from the at least one previous frame, the reference model including data representing a reference surface corresponding to at least one dynamic object captured in the plurality of video frames;
   processing the data representing the depth map of the current frame to produce data for a directional distance function (DDF) field that represents an area surrounding a target surface of the at least one dynamic object captured in the current frame;
   generating a forward transformation that modifies the data representing the reference surface to align with data representing the target surface and generate data for a modified reference surface;
   calculating a backward transformation that modifies data representing the target surface of the current frame to align with the reference surface, wherein the backward transformation uses at least a portion of the forward transformation;
   generating a transformed DDF by applying the backward transformation to the DDF;
   fusing the transformed DDF into a multi-mode distance function (MDDF) comprising multiple distance values and direction vectors at each of a plurality of voxels; and
   updating the reference model based on the MDDF to produce data for an updated reference model.

2. The method of claim 1, further comprising transmitting data for the updated reference model to enable a representation of the dynamic object to be produced at a remote location.

3. The method of claim 1, further comprising:

updating the data for the reference surface using the updated reference model to produce an updated reference surface; and applying a texture to the data for the updated reference surface based on at least one image from the plurality of video frames.

4. The method of claim 1, further comprising receiving the plurality of video frames from a plurality of video cameras, each of the plurality of video cameras configured to measure a distance to one or more objects in a physical scene.

5. The method of claim 4, wherein each of the plurality of video frames comprises a composite of video frames from the plurality of video cameras.

6. The method of claim 1, wherein the portion of the forward transformation used in calculating the backward transformation comprises a set of matched key points.

7. The method of claim 1, wherein generating data for the modified reference surface comprises deforming each particular point with a three dimensional position vector v from a plurality of points on the reference surface to align with the target surface by applying a linearly blended affine transformation from a set of points neighboring the particular point according to $$\tilde{v} = \sum_{j \in N} w_j [A_j (v - g_j) + g_j + t_j],$$

where $\tilde{v}$ is a position vector of the particular point after the deformation, N is the set of neighboring nodes of v on the deformation graph, $w_j$ is a blending weight for a $j^{th}$ node in the set N, $g_j$ is a position vector of the $j^{th}$ node, $A_j$ is a 3×3 matrix, and $t_j$ is a translation vector of the $j^{th}$ node, wherein $A_j$ and $t_j$ represent the affine transformation associated with the $j^{th}$ node on the deformation graph, and wherein collectively $\{<A_j, t_j>\}_{j=0,\ldots,J}$ represent the deformation parameters of the deformation graph, where J is the number of the graph nodes in the deformation graph.

8. The method of claim 7, wherein the deformation parameters $\{<A_j, t_j>\}_{j=0,\ldots,J}$ in the deformation graph are estimated by solving $$\min_{\{(A_j,t_j)\}} w_{rot}E_{rot} + w_{reg}E_{reg} + w_{con}E_{con} + w_{dns\_pts}E_{dns\_pts} + w_{clr}E_{clr},$$

where $w_{rot}$, $w_{reg}$, $w_{con}$, $w_{dns\_pts}$, and $w_{clr}$, are weighting coefficients, $E_{rot}$ is an energy term that constrains column vectors of $A_j$ to be orthogonal and unitary, $E_{reg}$ is an energy term that ensures smoothness of the deformed reference surface, $E_{con}$ is an energy term that matches at least one key point between the deformed reference surface and the target surface, $E_{dns\_pts}$ is an energy term that aligns a dense point cloud according to the DDF, and $E_{clr}$ is an energy term that aligns a color vector derived from the image of the current frame with a color vector derived from the image of the at least one previous frame.

9. The method of claim 7, wherein the affine transformation $A_j$ and the translation vector $t_j$ for the $j^{th}$ neighboring point are estimated by solving $$\min_{\{(A_j,t_j)\},\{(R_j,T_j)\}} w_{rot}E_{rot} + w_{reg}E_{reg} + \qquad(14)$$
$$w_{con}E_{con} + w_{dns\_pts}E_{dns\_pts} + w_{clr} + E_{clr} + w_{insct}E_{insct},$$

where $w_{rot}$, $w_{reg}$, $w_{con}$, $w_{dns\_pts}$, $w_{clr}$, and $w_{insct}$, are weighting coefficients, $E_{rot}$ is an energy term that constrains column vectors of $A_j$ to be orthogonal and unitary, $E_{reg}$ is an energy term that ensures smoothness of the deformed reference surface, $E_{con}$ is an energy term that matches at least one key point between the reference surface and the deformed reference surface, $E_{dns\_pts}$ is an energy term that aligns a dense point cloud according to the DDF, $E_{clr}$ is an energy term that aligns a color vector derived from the image of the current frame with a color vector derived from the image of the at least one previous frame, $E_{insct}$ is an energy term that ensures the reference model does not intersect with a second object, $R_j$ is a rotation parameter for the second object, and $T_j$ is a translation parameter for the second object.

10. An apparatus comprising:

a network interface configured to communicate data across a computer network;

a user interface unit configured to communicate with at least one video camera;

a processor configured to:

receive a plurality of video frames through the user interface unit, wherein the plurality of video frames comprises a current frame and at least one previous frame, and wherein each of the plurality of video frames includes data for a corresponding image and data for a corresponding depth map;

receive a reference model comprising data from the at least one previous frame, the reference model including data representing a reference surface corresponding to at least one dynamic object captured in the plurality of video frames;

process the data representing the depth map of the current frame to produce data for a directional distance function (DDF) field that represents an area surrounding a target surface of the at least one dynamic object captured in the current frame;

generate a forward transformation that modifies the data representing the reference surface to align with data representing the target surface;

calculate a backward transformation that modifies data representing the target surface of the current frame to align with the reference surface, wherein the backward transformation uses at least a portion of the forward transformation;

generate a transformed DDF by applying the backward transformation to the DDF;

fuse the transformed DDF into a multi-mode distance function (MDDF) comprising multiple distance values and direction vectors at each of a plurality of voxels; and update the reference model based on the MDDF to produce data for an updated reference model.

11. The apparatus of claim 10, wherein the processor is further configured to transmit data for the updated reference model via the network interface unit to enable a representation of the dynamic object to be produced at a remote location.

12. The apparatus of claim 10, wherein the processor is further configured to update the data for the reference surface using the updated reference model to produce an updated reference surface, and apply a texture to the data for the updated reference surface based on at least one image from the plurality of video frames.

13. The apparatus of claim 10, wherein the user interface unit is further configured to receive the plurality of video frames from a plurality of video cameras, each of the plurality of video cameras configured to measure a distance to one or more objects in a physical scene.

14. The apparatus of claim 13, wherein each of the plurality of video frames comprises a composite of video frames from the plurality of video cameras.

15. The apparatus of claim 10, wherein the processor is further configured to use a set of matched key points from the forward transformation to calculate the backward transformation.

16. A system comprising:
a plurality of video cameras configured to capture a plurality of video frames comprising a current frame and at least one previous frame, and wherein each of the plurality of video frames includes data for a corresponding image and data for a corresponding depth map;
a computing device configured to:
  receive the plurality of video frames;
  receive a reference model comprising data from the at least one previous frame, the reference model including data representing a reference surface corresponding to at least one dynamic object captured in the plurality of video frames;
  process the data representing the depth map of the current frame to produce data for a directional distance function (DDF) field that represents an area surrounding a target surface of the at least one dynamic object captured in the current frame;
  generate a forward transformation that modifies the data representing the reference surface to align with data representing the target surface;
  calculate a backward transformation that modifies data representing the target surface of the current frame to align with the reference surface, wherein the backward transformation uses at least a portion of the forward transformation;
  generate a transformed DDF by applying the backward transformation to the DDF;
  fuse the transformed DDF into a multi-mode distance function (MDDF) comprising multiple distance values and direction vectors at each of a plurality of voxels; and
  update the reference model based on the MDDF to produce data for an updated reference model.

17. The system of claim 16, wherein the computing device is further configured to transmit data for the updated reference model to enable a representation of the dynamic object to be produced at a remote location.

18. The system of claim 16, wherein the computing device is further configured to update the data for the reference surface using the updated reference model to generate an updated reference surface, and apply a texture to the data for the updated reference surface based on at least one image from the plurality of video frames.

19. The system of claim 16, wherein at least one of the plurality of video cameras is configured to measure a distance to one or more objects in a physical scene.

20. The system of claim 16, wherein each of the plurality of video frames comprises a composite of video frames from the plurality of video cameras.

21. The system of claim 16, wherein the computing device is further configured to use a set of matched key points from the forward transformation to calculate the backward transformation.

* * * * *